US012300207B2

(12) United States Patent
Li et al.

(10) Patent No.: US 12,300,207 B2
(45) Date of Patent: May 13, 2025

(54) FLEXURAL WAVE ABSORBERS FOR WAVE AND VIBRATION ISOLATION IN THIN WALLED STRUCTURES

(71) Applicant: Toyota Motor Engineering & Manufacturing North America, Inc., Plano, TX (US)

(72) Inventors: Xiaopeng Li, Ann Arbor, MI (US); Ziqi Yu, Ann Arbor, MI (US); Taehwa Lee, Ann Arbor, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 379 days.

(21) Appl. No.: 17/848,757

(22) Filed: Jun. 24, 2022

(65) Prior Publication Data

US 2023/0419939 A1 Dec. 28, 2023

(51) Int. Cl.
*G10K 11/172* (2006.01)
*G10K 11/162* (2006.01)

(52) U.S. Cl.
CPC .......... *G10K 11/172* (2013.01); *G10K 11/162* (2013.01)

(58) Field of Classification Search
CPC .... G10K 11/162; G10K 11/172; G10K 11/36; G10K 11/175; F16F 9/306; F16F 15/02; F16F 15/08
USPC .......................................... 181/207, 208, 286
See application file for complete search history.

(56) References Cited

U.S. PATENT DOCUMENTS

| | | | | |
|---|---|---|---|---|
| 4,373,608 | A * | 2/1983 | Holmes ..................... | F16F 7/10 181/208 |
| 4,736,701 | A * | 4/1988 | Kondo .................... | B63B 15/00 114/340 |
| 6,373,956 | B1 * | 4/2002 | Varla ...................... | H04R 3/002 181/208 |
| 8,752,667 | B2 * | 6/2014 | McKnight ............ | G10K 11/172 181/207 |
| 9,418,646 | B2 * | 8/2016 | Daley .................. | G10K 11/172 |
| 9,444,403 | B2 | 9/2016 | Yamada | |
| 9,466,283 | B2 * | 10/2016 | Yang .................... | G10K 11/175 |
| 9,520,121 | B2 | 12/2016 | Sheng et al. | |

(Continued)

OTHER PUBLICATIONS

Suppression of bending waves in a beam using resonators with different separation lengths. (Year: 2016).*

(Continued)

*Primary Examiner* — Forrest M Phillips
*Assistant Examiner* — Joseph James Peter Illicete
(74) *Attorney, Agent, or Firm* — Christopher G. Darrow; Darrow Mustafa PC

(57) ABSTRACT

A flexural wave absorber includes a metasurface with an inner portion, an outer portion, and a plurality of beam strips extending between the inner portion and the outer portion. The metasurface also includes a plurality of coupled resonators disposed on the plurality of beam strips. The plurality of coupled resonators can include a lossy resonator and a lossless resonator, two lossy resonators and a lossless resonator, or a lossy resonator and two lossless resonators. In addition, each of the plurality of beam strips can have multiple pairs of coupled resonators disposed thereon that work at or absorb different frequency ranges.

20 Claims, 7 Drawing Sheets

(56) References Cited

U.S. PATENT DOCUMENTS

| | | | | |
|---|---|---|---|---|
| 9,631,692 | B2 * | 4/2017 | Carcaterra | F16F 7/10 |
| 2006/0169557 | A1 * | 8/2006 | Goetchius | F16F 7/104 188/378 |

OTHER PUBLICATIONS

Acoustic metamaterial plates for elastic wave absorption and structural vibration suppression. (Year: 2019).*
Limits of flexural wave absorption by open lossy resonators: reflection and transmission problems. (Year: 2019).*
Non-symmetric flexural wave scattering and one-way extreme absorption. (Year: 2019).*
Pai, P., "Metamaterial-based Broadband Elastic Wave Absorber," Journal of Intelligent Materal Systems and Structure, vol. 21, Mar. 2010, pp. 517-528.
Li et al., "An active meta-layer for optimal flexural wave absorption and cloaking," Mechanical Systems and Signal Processing 149 (2021) 107324 pp. 1-13.
Chen et al., "A metamaterial structure capable of wave attenuation and concurrent energy harvesting," Journal of Intelligent Material Systems and Structures (2019), vol. 30(20) pp. 2973-2981.
Cummer et al., "Controlling sound with acoustic metamaterials," Nature Reviews/Materials, www.nature.com/natrevmats, Feb. 16, 2016, pp. 1-13.
Neuwerk et al., "Soud Absorption by textile resonators," Vibroengineering Procedia, May 2020, vol. 31, pp. 103-108.
Anigbogu et al., "Layered Metamaterial Beam Structures With Local Resonators for Vibration Attenuation: Model and Experiment," Frontiers in Mechanical Engineering, Oct. 25, 2021, vol. 7, Article 768508, pp. 1-13.
Zhu et al., "Experimental study of vibration isolation in thin-walled structural assemblies with embedded total-internal-reflection metasurfaces," Journal of Sound and Vibration, vol. 456, Sep. 15, 2019, pp. 162-172.

* cited by examiner

FIG. 1
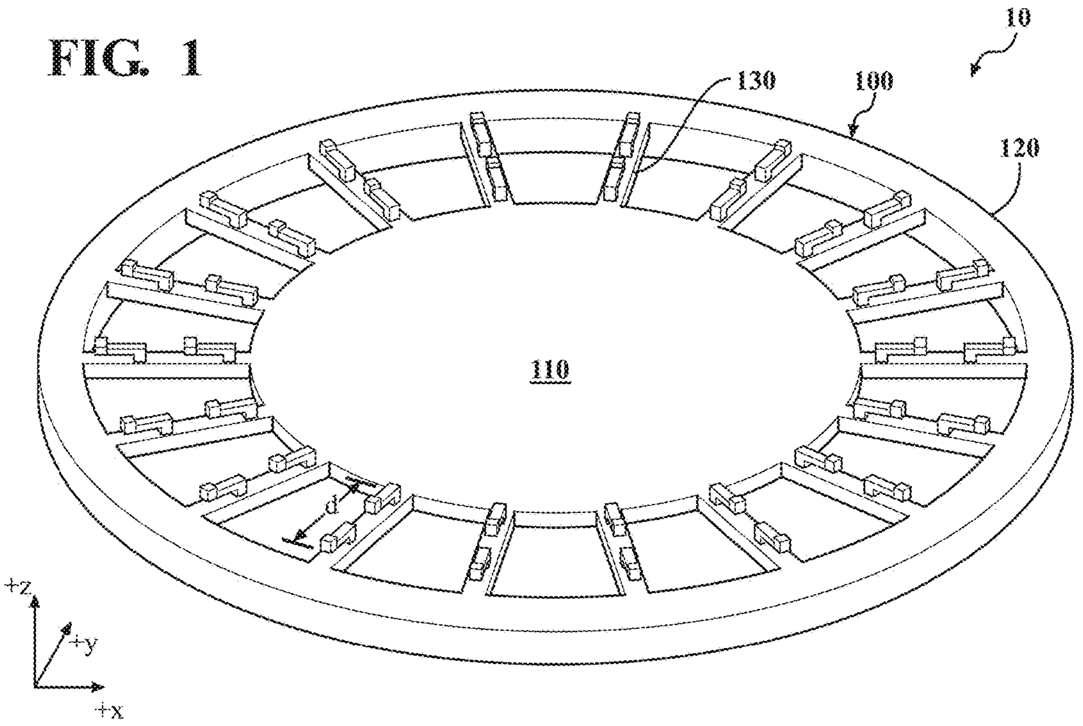
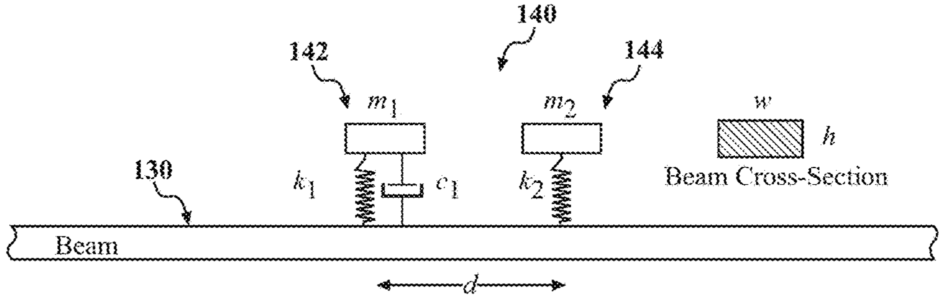
FIG. 2A
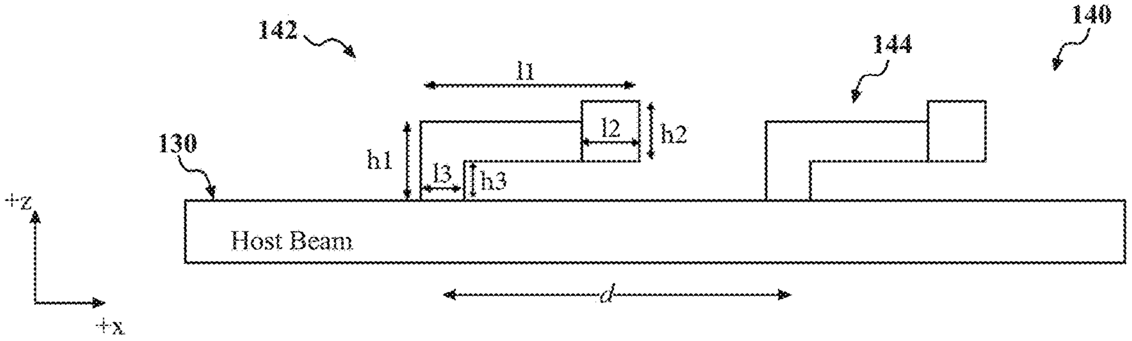
FIG. 2B

FIG. 3A
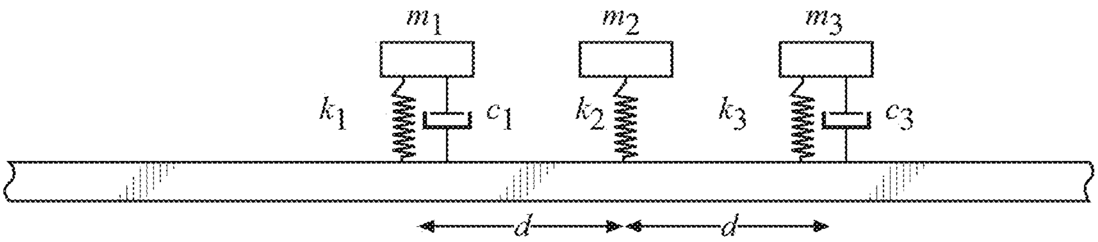
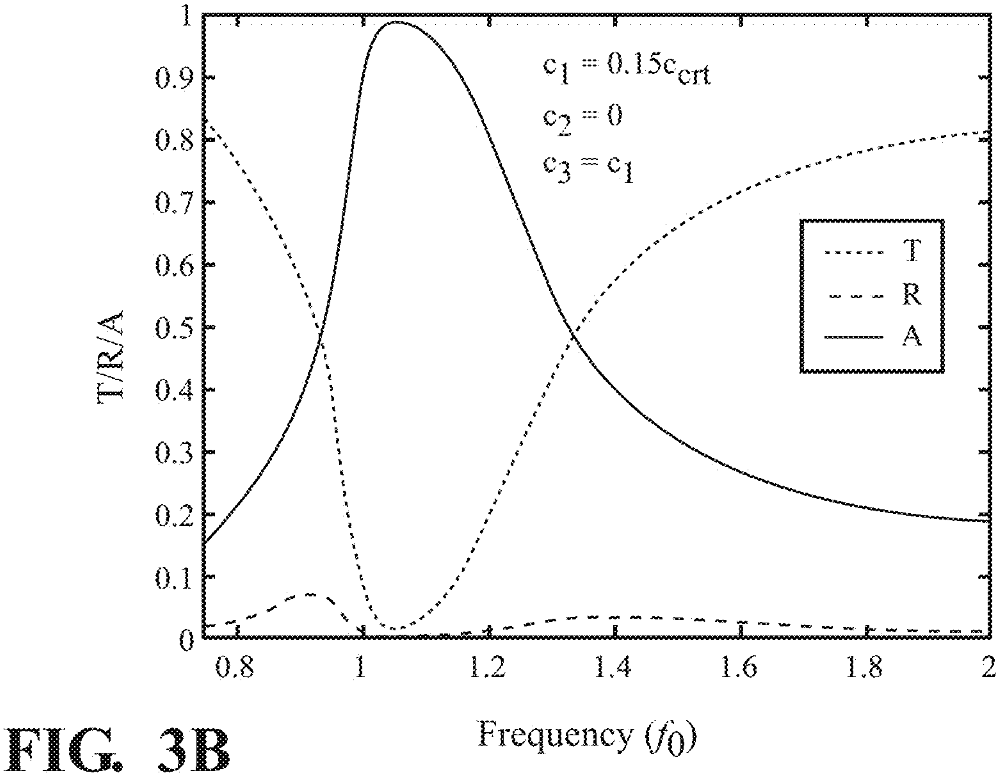
FIG. 3B
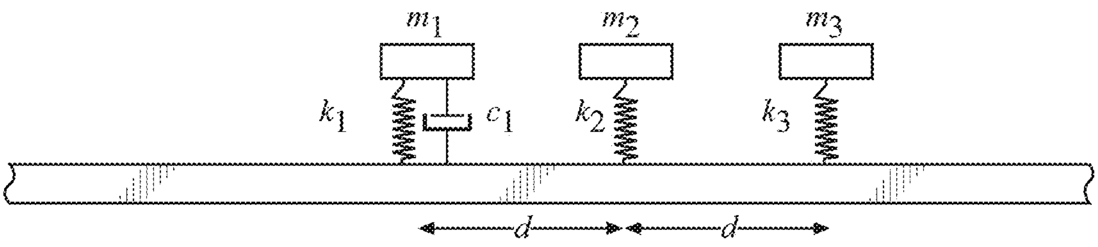
FIG. 4A

FLEXURAL WAVE ABSORBERS FOR WAVE AND VIBRATION ISOLATION IN THIN WALLED STRUCTURES

TECHNICAL FIELD

The present disclosure relates generally to flexural wave absorbers, and particularly to flexural wave absorbers for thin wall structures.

BACKGROUND

Sound radiation (i.e., noise) is typically the result of flexural waves, also known as bending waves, propagating across a surface of structure and deforming the structure transversely to the surface. In addition, flexural waves are generally more complicated compared to compression or shear waves acting on a structure since flexural waves are dependent on the material and geometric properties of the structure and can be dispersive since flexural waves with different frequencies travel at different speeds.

Traditional solutions for absorbing flexural waves include using dampening materials or nonlinear materials. However, these solutions reduce the bending stiffness of a structure and/or add additional mass to the structure. In addition, traditional solutions fail to absorb low frequency flexural waves such that different and/or broad frequency domains are absorbed.

The present disclosure addresses issues related to the flexural wave absorbers, and other issues related to flexural wave absorption.

SUMMARY

This section provides a general summary of the disclosure and is not a comprehensive disclosure of its full scope or all of its features.

In one form of the present disclosure, a flexural wave absorber includes a metasurface with an inner portion, an outer portion, and a plurality of beam strips extending between the inner portion and the outer portion. The metasurface also includes a plurality of coupled resonators disposed on the plurality of beam strips.

In another form of the present disclosure, a flexural wave absorber includes a metasurface with an inner portion, an outer portion, and a plurality of beam strips extending between the inner portion and the outer portion. The metasurface also includes a lossy resonator and a lossless resonator disposed on each of the plurality of beam strips.

In still another form of the present disclosure, a flexural wave absorber includes a plurality of metasurfaces attached to a panel. The plurality of metasurfaces each include an inner portion, an outer portion, a plurality of beam strips extending between the inner portion and the outer portion, and a lossy resonator and a lossless resonator disposed on each of the plurality of beam strips.

Further areas of applicability and various methods of enhancing the above technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein:

FIG. 1 shows a flexural wave absorber according to one form of the present disclosure;

FIG. 2A illustrates a mechanical model for coupled resonators according to one form of the present disclosure;

FIG. 2B illustrates one example of the coupled resonators shown in FIG. 2A;

FIG. 3A illustrates a mechanical model for coupled resonators according to another form of the present disclosure;

FIG. 3B is a plot of transmission, reflection, and absorption as a function of flexural wave frequency for the coupled resonators shown in FIG. 3A;

FIG. 4A illustrates a mechanical model for coupled resonators according to still another form of the present disclosure;

DETAILED DESCRIPTION

Figure 2C:
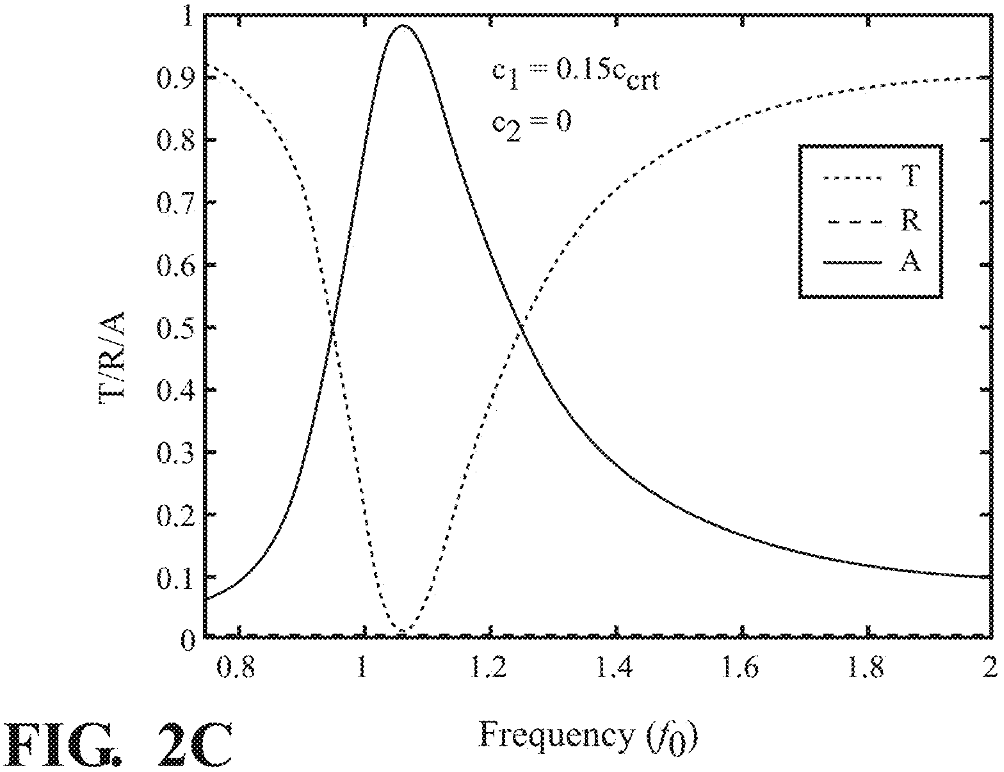
FIG. 2C is a plot of transmission, reflection, and absorption as a function of flexural wave frequency for the coupled resonators shown in FIG. 2A and for flexural waves propagating from left to right (+x direction) in the figure.

The present disclosure provides flexural wave absorbers for wave and vibration isolation in thin walled structures. The flexural wave absorbers include one or more metasurfaces with an inner portion, an outer portion, and a plurality of beam strips extending between and mechanically connected to the inner portion and the outer portion. In addition, coupled resonators are disposed on at least a subset of the plurality of beam strips. In some variations, the coupled resonators include at least one lossy resonator and at least one lossless resonator, and in some variations the coupled resonators include one lossy resonator and two lossless resonators or two lossy resonators and one lossless resonator. As used herein, the phrase "coupled resonators" refers to two or more resonators disposed on a beam strip with a coupling coefficient characterizing interaction between the two or more resonators.

Referring to FIG. 1, a flexural wave absorber 10 according to the teachings of the present disclosure includes a metasurface 100 with an inner portion 110, an outer portion 120, and a plurality of beam strips 130 (also referred to herein simply as "beam strips 130") extending between the inner portion 110 and the outer portion 120. In addition, and as observed form FIG. 1, a vacant space extends through the metasurface 100 between adjacent beam strips 130 and each vacant space extends between the inner portion 110 and the outer portion 120. Stated differently, the metasurface 100 has vacant spaces or openings defined by the inner portion 110, the outer portion 120, and adjacent beam strips 130. In some variations, the beam strips 130 are formed integral with the inner portion 110, and/or the outer portion 120. Stated differently, the inner portion 110 and the beam strips 130, the outer portion 120 and the beam strips 130, or the inner portion 110 and the outer portion 120 and the beam strips 130 are a monolithic structure. And while the metasurface 100 shown in FIG. 1 is circular in shape, i.e., the inner portion 110 is an inner circular disc and the outer portion 120 is an outer circular ring, it should be understood that metasurfaces with different shapes and designs are included in the teachings of the present disclosure as described below.

Still referring to FIG. 1, the flexural wave absorber 10 also includes coupled resonators 140 disposed on at least a subset of the beam strips 130. In some variations the coupled resonators 140 are disposed on an upper (+z direction) surface of the beam strips 130, while in other variations the coupled resonators 140 are disposed on a lower (−z direction) surface of the beam strips 130. And in at least one variation, a first subset of the coupled resonators 140 are disposed on an upper surface of a first subset of the beam strips 130 and a second subset of the coupled resonators 140 are disposed on a lower surface of a second subset of the beam strips 130. As observed in FIG. 1, in some variations the coupled resonators 140 are attached or disposed directly on the beam strips 130, i.e., the coupled resonators are in direct contact with the beam strips 130. In addition, in some variations the coupled resonators 140 are disposed on all of beam strips 130 extending along the outer circumference of the inner portion 110 while in other variations the coupled resonators are disposed on alternating beam strips 130 extending along an outer circumference of the inner portion 110. That is, the coupled resonators 140 are disposed on every '$x^{th}$', beam strip 130 extending along the outer circumference of the inner portion 110, where x=2, 3, 4, 5, 6, 7, or 8.

In some variations, the outer portion 120 is rigid (e.g., rigidly attached to a thin wall structure), and the inner portion 110 is free to vibrate, while in other variations the inner portion 110 is rigid and the outer portion 120 is free to vibrate. However, in all variations the beam strips extend between the inner portion 110 and the outer portion 120 and are configured to assist in vibration absorption as discussed in greater detail below.

Referring now to FIGS. 2A and 2B, a mechanical model of coupled resonators 140 on a beam strip 130 according to one form of the present disclosure is shown in FIG. 2A and a non-limiting example of the coupled resonators 140 is shown in FIG. 2B. The beam strip has a thickness or height 'h', a width 'w', and the coupled resonators 140 includes a lossy resonator 142 and a lossless resonator 144 (also referred to herein collectively as "resonators 142, 144") spaced apart from the lossy resonator 142 by a predefined distance 'd'. The lossy resonator 142 is modeled or characterized by a mass $m_1$, a spring constant $k_1$, and a damping constant $c_1$, and the lossless resonator 144 is modeled or characterized by a mass $m_2$, a spring constant $k_2$, and a damping constant $c_2=0$. Also, the labeled dimensions, h1, h2, h3, l1, l2, and l2 shown in FIG. 2B are discussed in greater detail below with respect to FIGS. 5A and 5B.

Figure 2D:
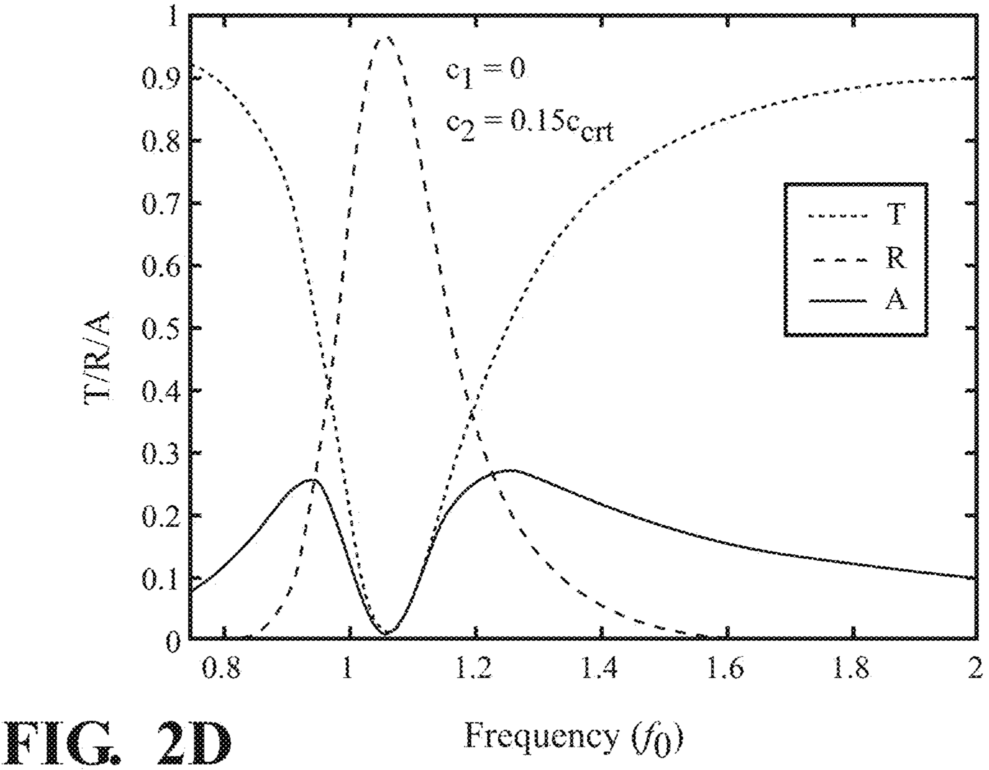
FIG. 2D is a plot of transmission, reflection, and absorption as a function of flexural wave frequency for the coupled resonators shown in FIG. 2A and for flexural waves propagating from right to left (−x direction) in the figure.

Referring to FIGS. 2C and 2D, simulated transmission (T), reflection (R), and absorption (A) (also referred to herein as "T/R/A") of flexural waves with a range of frequencies propagating along the beam strip 130 in the +x direction and the −x direction, respectively, are shown. The simulations assumed the beam strip 130 had a thickness (h) equal to 2 millimeters (mm), a width (w) equal to 50 mm. Also, the resonators were modeled with $m_1=m_2=m_o$, $k_1=k_2=k_o$, $c_1=0.015\cdot c_{crt}$ ($c_{crt}$=critical damping coefficient), $c_{crt}=2\sqrt{k_o m_o}$, the distance 'd' between the resonators 142, 144 equal to 0.2λ where λ equals the flexural wave wavelength at the resonant frequency $f_o$ which is defined as $$f_o = \frac{1}{2\pi}\sqrt{k_o/m_o}.$$

And as observed from comparing FIGS. 2C and 2D, the resonators 142, 144 exhibited close to unity (i.e., 100%) absorption of flexural waves with a frequency of about $1.05f_o$ propagating in the +x direction, but exhibited close to unity reflection of the flexural waves with a frequency of about $1.05f_o$ propagating in the −x direction. It should be understood that based on the modeling parameters, the frequency(ies) absorbed and reflected are a function of the mass and spring constants of the lossy resonator 142 and the lossless resonator 144. Accordingly, the resonators 142, 144 exhibit or provide significant (extreme) asymmetric absorption, i.e., absorption dependent on direction of incidence.

Referring to FIGS. 3A and 3B, a mechanical model of coupled resonators 140 on a beam strip 130 according to another form of the present disclosure is shown in FIG. 3A, and simulated T/R/A of flexural waves with a range of frequencies propagating along the beam strip 130 in the +x and −x directions are shown in FIG. 3B. The coupled resonators 140 in FIG. 3A includes the lossy resonator 142 and the lossless resonator 144 spaced apart from the lossy resonator 142 by the predefined distance 'd', plus another lossy resonator 146 spaced apart from the lossless resonator 144 (referred to herein collectively as "resonators 142, 144, 146") by the predefined distance d. The simulations assumed the beam strip 130 had a thickness h equal to 2 mm, a width w equal to 50 mm, $m_1=m_2=m_3=m_o$, $k_1=k_2=k_3=k_o$, $c_1=c_3=0.015\cdot c_{crt}$, $c_2=0$, the distance between the resonators 142, 144 and between 144, 146 equal to 0.2λ where λ equals the flexural wave wavelength at the resonant frequency $f_o$ which is defined as $$f_o = \frac{1}{2\pi}\sqrt{k_o/m_o}.$$

And as observed from FIG. 3B, the symmetric structure of the coupled resonators 140 with the resonators 142, 144, 146 (i.e., a lossy-lossless-lossy arrangement) results in approximate unity absorption of flexural waves with a frequency of about $1.05f_o$ propagating in both the +x direction and the −x direction. In addition, the coupled resonators 140 with the resonators 142, 144, 146 absorb more than 80% of the flexural waves with frequencies between about $1.0f_o$ and about $1.2f_o$. Stated differently, the coupled resonators 140 with the resonators 142, 144, 146 absorb more than 80% of an about $0.2f_o$ frequency range where $f_o$ is defined as above.

Accordingly, the resonators 142, 142, 146 exhibit or provide symmetric absorption, i.e., absorption independent of direction of incidence.

Figure 4B:
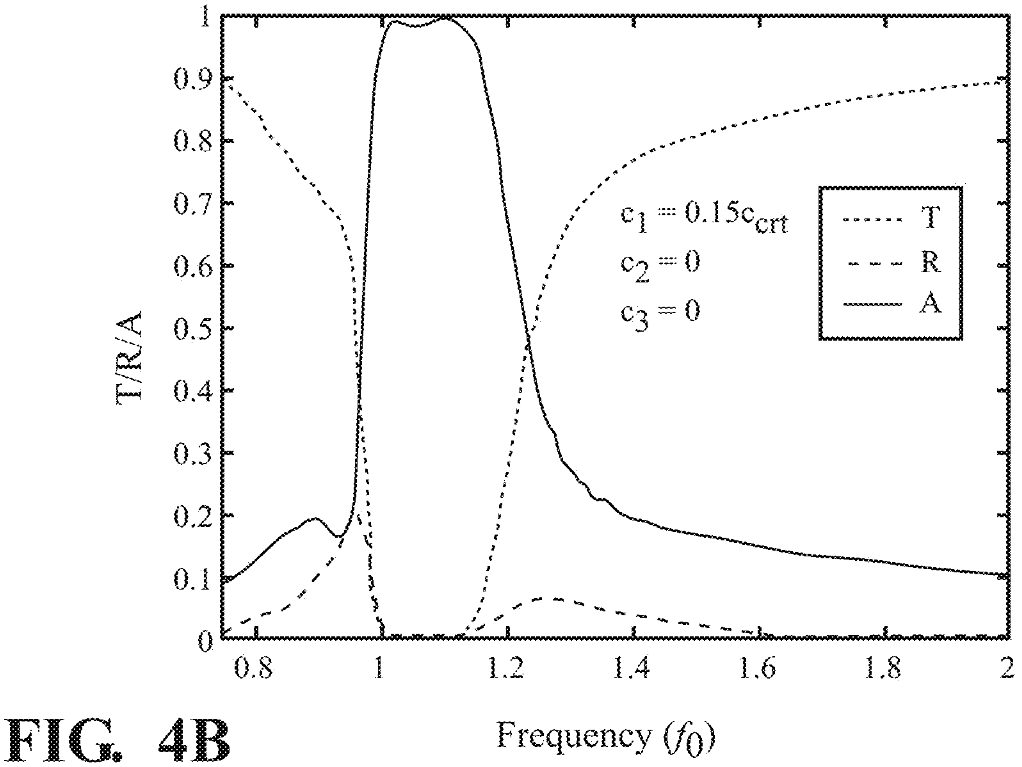
FIG. 4B is a plot of transmission, reflection, and absorption as a function of flexural wave frequency for the coupled resonators shown in FIG. 4A and for flexural waves propagating from left to right (+x direction) in the figure.
Figure 4C:
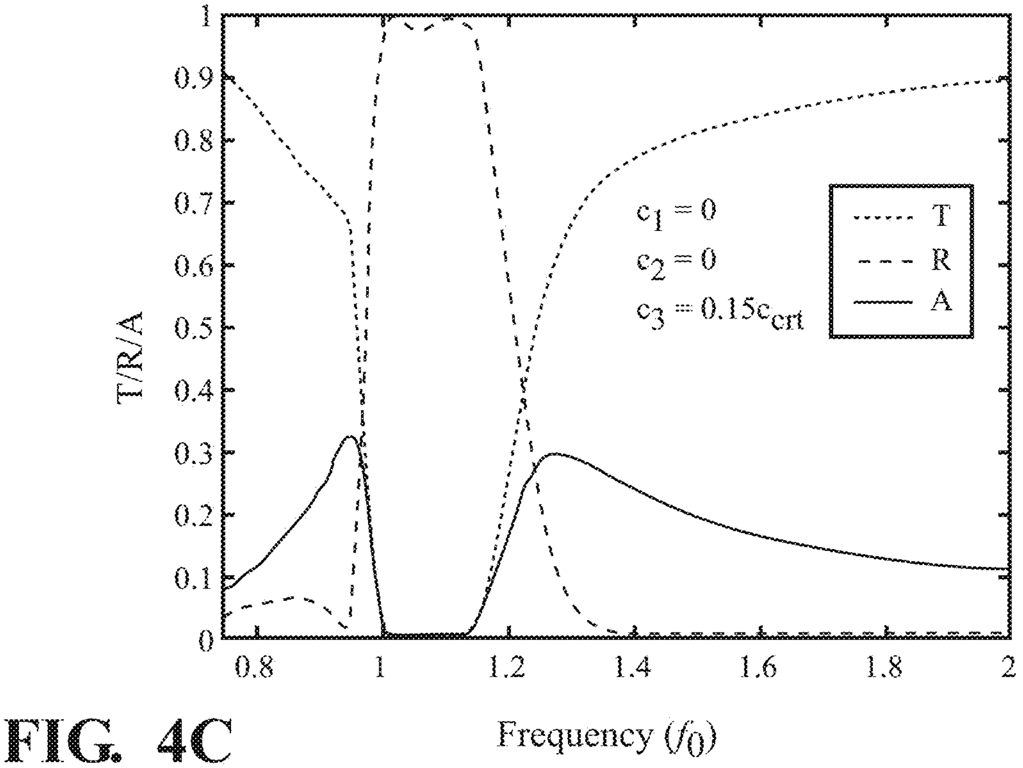
FIG. 4C is a plot of transmission, reflection, and absorption as a function of flexural wave frequency for the coupled resonators shown in FIG. 2A and for flexural waves propagating from right to left (−x direction) in the figure.

Referring to FIGS. 4A-4C, a mechanical model of coupled resonators 140 on a beam strip 130 according to still another form of the present disclosure is shown in FIG. 4A, simulated T/R/A of flexural waves with a range of frequencies propagating along the beam strip 130 in the +x are shown in FIG. 4B, and simulated T/R/A of flexural waves with a range of frequencies propagating along the beam strip 130 in the −x are shown in FIG. 4C. The coupled resonators 140 in FIG. 4A includes the lossy resonator 142 and the lossless resonator 144 spaced apart from the lossy resonator 142 by the predefined distance 'd', plus another lossless resonator 148 spaced apart from the lossless resonator 144 (referred to herein collectively as "resonators 142, 144, 148") by the predefined distance d. The simulations assumed the beam strip 130 had a thickness h equal to 2 mm, a width w equal to 50 mm, $m_1=m_2=m_3=k_1=k_2=k_3=k_o$, $c_1=0.015\cdot c_{crt}$, $c_2=c_3=0$, the distance 'd' between the resonators 142, 144 and between 144, 148 equal to 0.2λ where λ equals the flexural wave wavelength at the resonant frequency $f_o$ which is defined as $$f_o = \frac{1}{2\pi}\sqrt{k_o/m_o}\,.$$

And as observed in FIGS. 4B and 4C, the asymmetric structure of the coupled resonators 140 with the resonators 142, 144, 148 (i.e., a lossy-lossless-lossless arrangement) results in an increased range of flexural wave frequencies propagating in the +x direction that are absorbed and an increased range of flexural wave frequencies propagating in the −x direction that are reflected. Particularly, the coupled resonators 140 with the resonators 142, 144, 148 absorb more than 95% of the flexural waves propagating in the +x direction and with frequencies between $1.0f_o$ and $1.15f_o$. Stated differently, the coupled resonators 140 with the resonators 142, 144, 146 absorb more than 95% of a $0.15f_o$ frequency range of flexural waves propagating in a first direction and where to is defined as above. Accordingly, the resonators 142, 142, 148 exhibit or provide significant (extreme) asymmetric absorption for a range of flexural wave frequencies.

It should be understood from FIGS. 2A-4C that coupled resonators on beam strips can be used to absorb and/or reflect flexural waves propagating along the beam strips. In addition, different configurations of the coupled resonators can be designed and manufactured to absorb flexural waves with specific frequencies and/or with a specific range of frequencies.

Figure 5A:
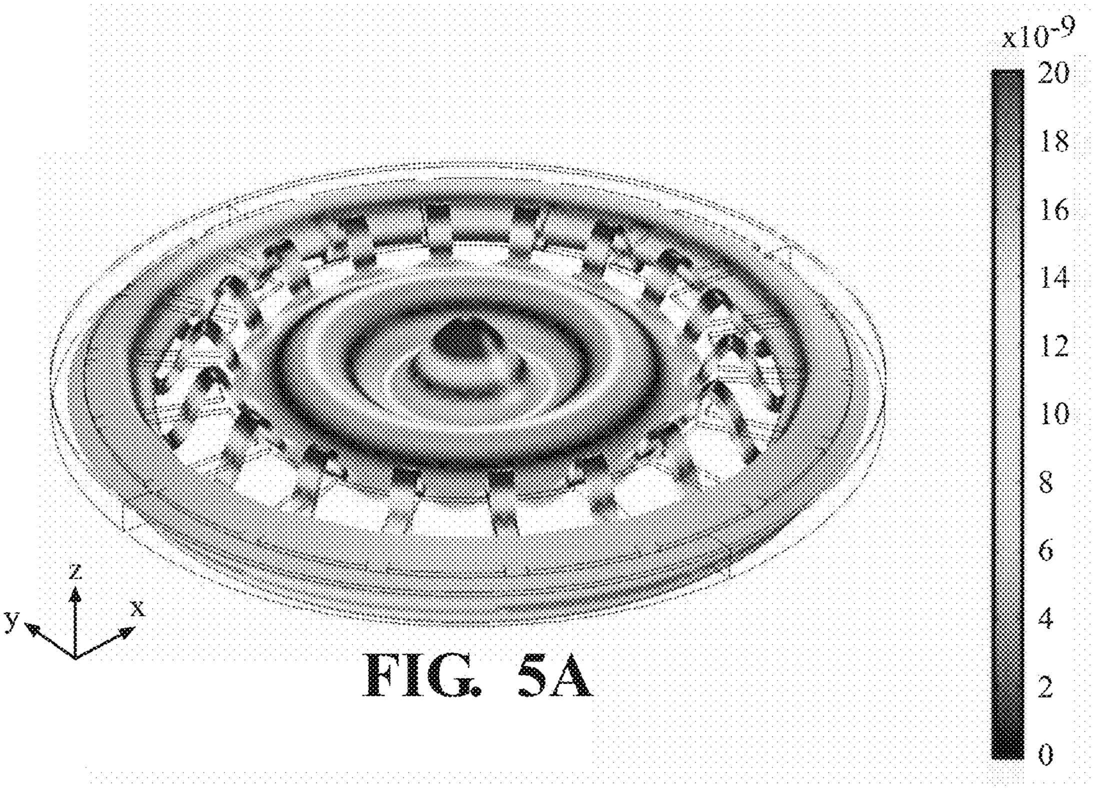
FIG. 5A illustrates a numerical simulation of the metasurface shown in FIG. 1 subjected to a vibration point source at a center of the structure but without coupled resonators on the beam strips.
Figure 5B:
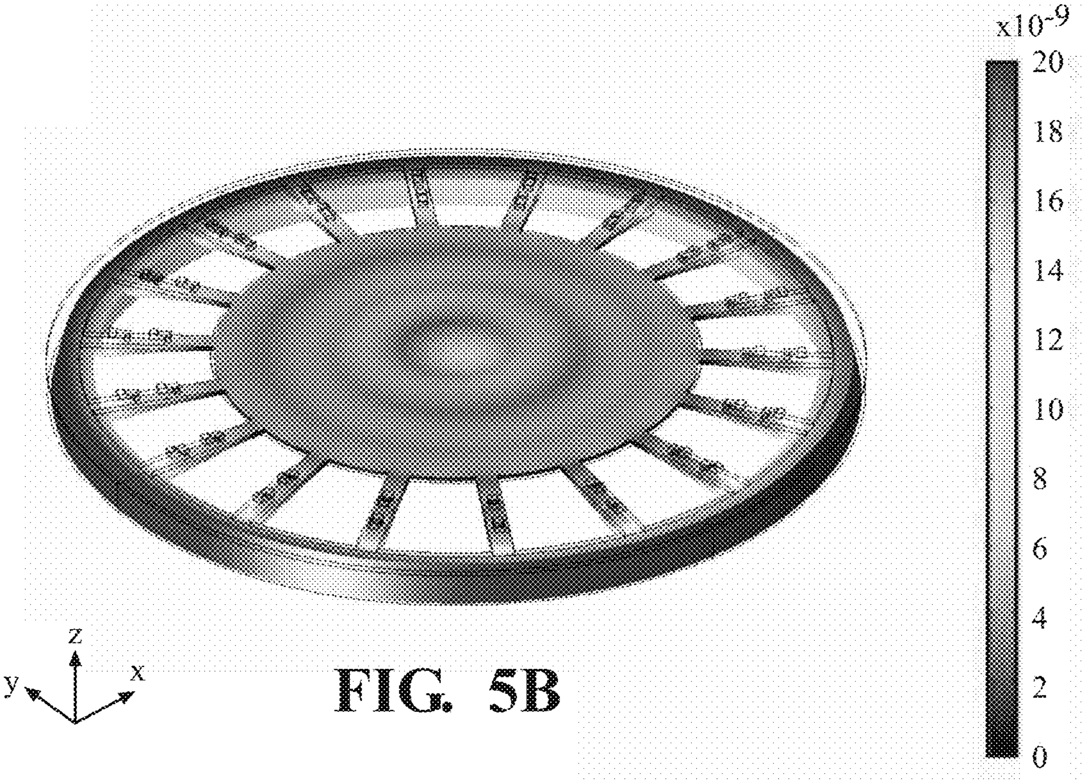
FIG. 5B illustrates a numerical simulation of the metasurface shown in FIG. 1 subjected to a vibration point source at a center of the structure and with coupled resonators on the beam strips.

Referring now to FIGS. 5A and 5B, demonstration of the coupled resonators 140 on the beam strips of the metasurface 100 in FIG. 1 is shown. Particularly, FIG. 5A is a COMSOL Multiphysics numerical simulation of the metasurface 100 subjected to a vibration point source at a center of the inner portion 110, but without coupled resonators 140 disposed on the beam strips 130. And FIG. 5B is a COMSOL Multiphysics numerical simulation of the metasurface 100 subjected to the same vibration point source at the center of the inner portion 110 and with coupled resonators 140 disposed on the beam strips 130. The simulations assumed the inner portion 110 had a diameter of 300 millimeters (mm) and a thickness of 3 mm and the outer portion 120 was rigid or fixed, had an outside diameter of 500 mm, and an inside diameter of 460 mm. The beam strips 130 had width of 12.7 mm and a thickness of 3 mm. In addition, the inner portion 110, outer portion 120, and the beam strips 130 were formed from aluminum with a Young's modulus of $4.5\times10^9$ Pa, a Poisson's ratio equal to 0.35, and a density of 1190 $kg/m^3$. And the outer portion 120 was rigidly attached to a ring of steel with a thickness 23 mm. Regarding the lossy resonator 142 and the lossless resonator 144, and with reference to FIG. 2B, both resonators were modeled with l1=12.9 mm, l2=4.8 mm, l3=3.1 mm, h1=4.2 mm, h2=3.6 mm, and h3=2.1 mm. The width (y direction in FIG. 2B) was 6 mm and damping was added for the lossy resonator 142.

Referring particularly to FIG. 5A, subjecting the metasurface 100 without the coupled resonators 140 to the vibration point source at the center of the inner portion 110 resulted in a large vibration amplitude of the inner portion 110. However, and with reference to FIG. 5B, subjecting the metasurface 100 with the coupled resonators 140 to the vibration point source at the center of the inner portion 110 resulted in minimal or negligible vibration amplitude of the inner portion 110. In addition, vibration of the outer portion 120 was significantly reduced. Accordingly, it should be understood that metasurfaces with coupled resonators according to the teachings of the present disclosure successfully suppress vibrations and reduce radiated acoustic noise.

Figure 6:
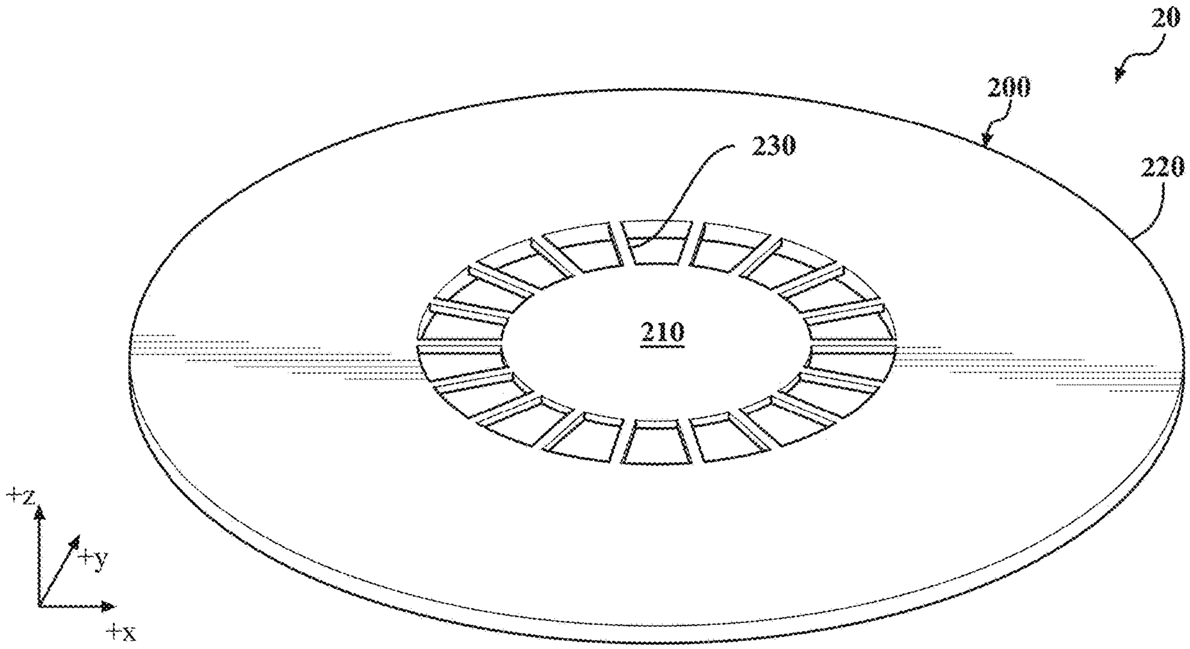
FIG. 6 shows a flexural wave absorber according to another form of the present disclosure.
Figure 7:
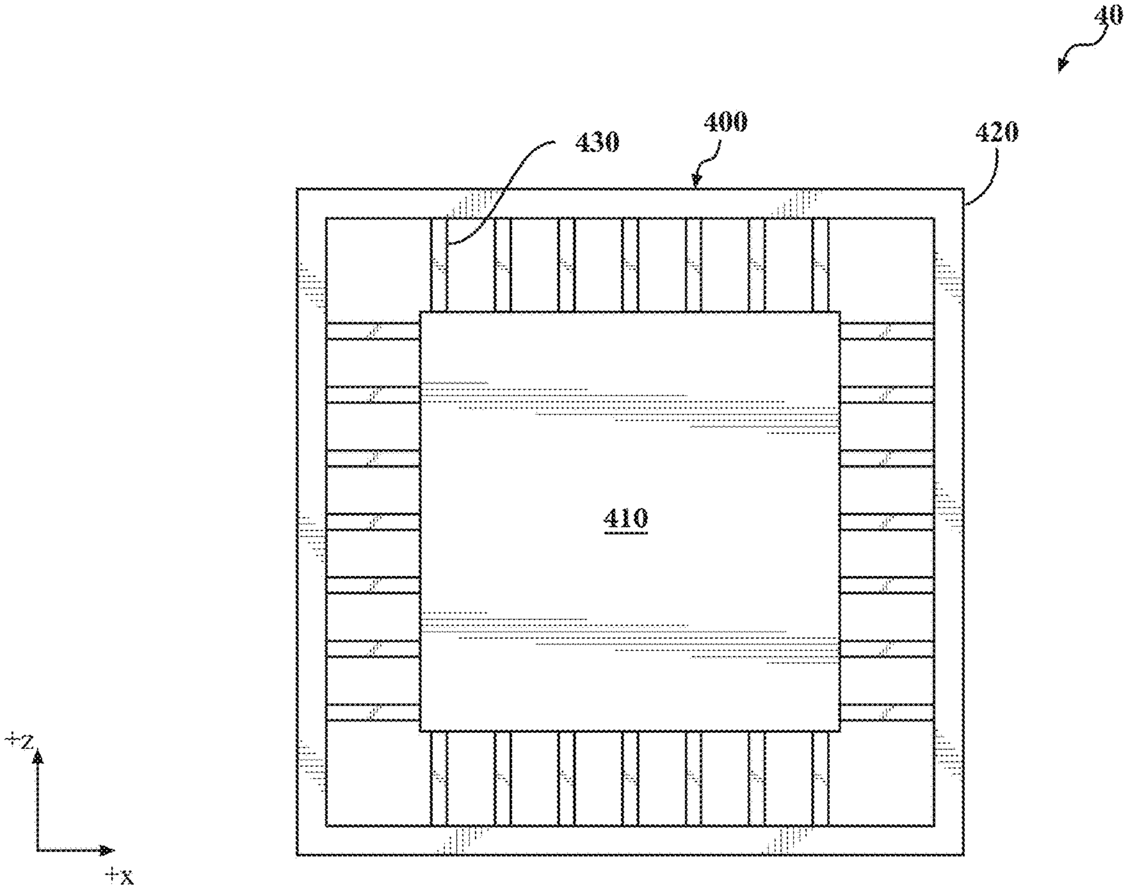
FIG. 7 shows a flexural wave absorber according to still another form of the present disclosure.
Figure 8:
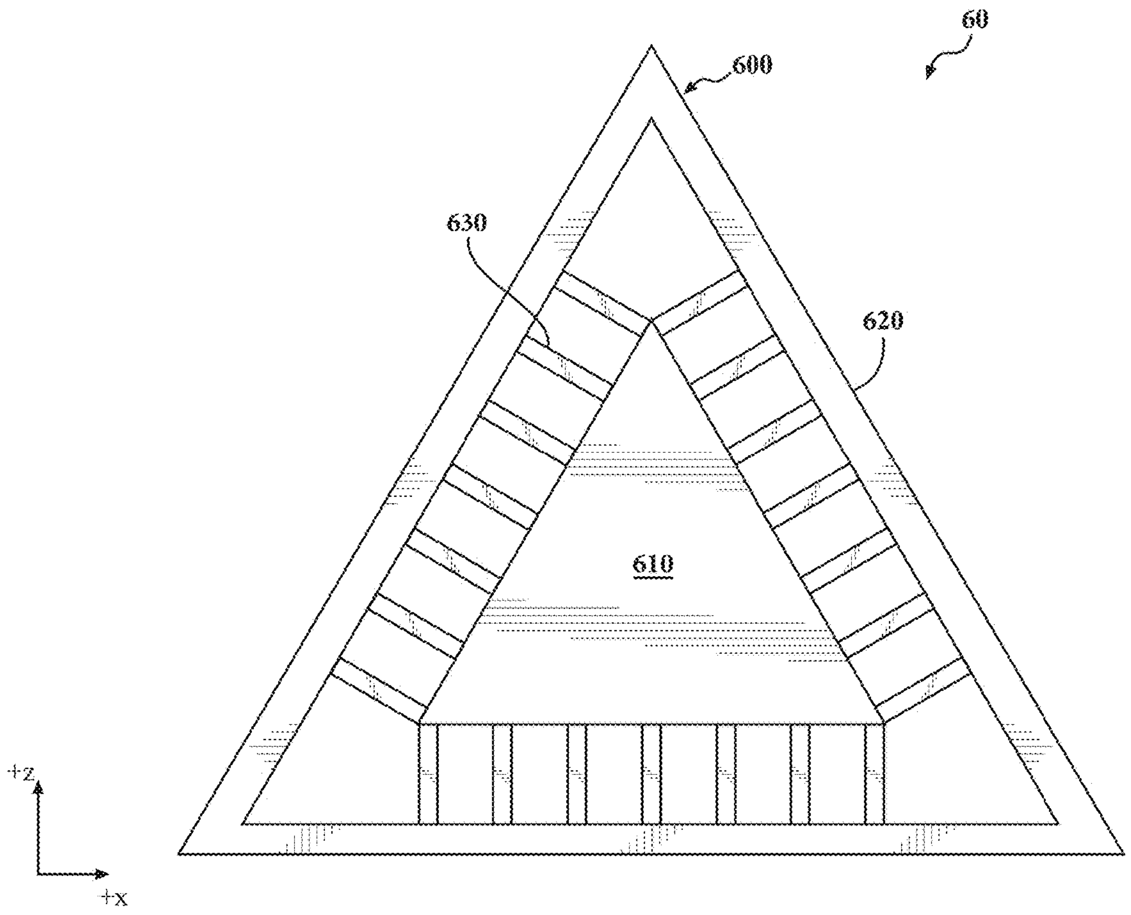
FIG. 8 shows a flexural wave absorber according to yet another form of the present disclosure.

Referring to FIGS. 6-8, flexural wave absorbers (coupled resonators not shown for clarity) according to other forms of the present disclosure are shown. For example, FIG. 6 shows a circular shaped flexural wave absorber 20 that includes a metasurface 200 with a circular shaped inner portion 210, a circular shaped outer portion 220 in the form of wide flat ring, and beam strips 230 with coupled resonators 240 disposed thereon. Also, FIG. 7 shows a rectangular shaped flexural wave absorber 14 that includes a metasurface 400 with a rectangular shaped inner portion 410, a rectangular shaped outer portion 420, and beam strips 430 with coupled resonators 440 disposed thereto. And FIG. 8 shows a triangular shaped flexural wave absorber 60 that includes a metasurface 600 with a triangular shaped inner portion 610, a triangular shaped outer portion 620, and beam strips 630 with coupled resonators 640 disposed thereto. It should be understood that flexural wave absorbers with other shapes are included within the teachings of the present disclosure. It should also be understood that similar to the metasurface 100, in some variations the outer portion 220, 420, 620 of the metasurface 200, 400, 600 is rigid and the inner portion 210, 410, 610 is free to vibrate, while in other variations, the inner portion 210, 410, 610 of the metasurface 200, 400, 600 is rigid and the outer portion 220, 420, 620 is free to vibrate.

Figure 9:
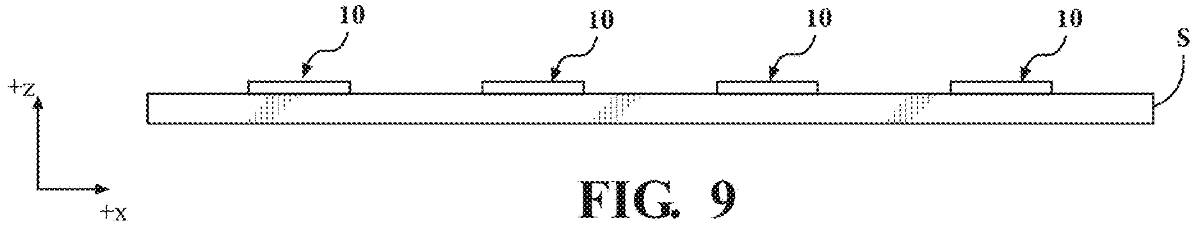
FIG. 9 illustrates a panel with a plurality of metasurfaces according to the teachings of the present disclosure.

Referring to FIG. 9, a component or substrate 'S' with a plurality of flexural wave absorbers 10 is shown (flexural wave absorber 10 shown for example purposes only). In some variations, the plurality of flexural wave absorbers 10 are disposed on or cover the entire substrate S as shown in FIG. 9, while in other variations a plurality of flexural wave absorbers 10 are disposed on or cover only a portion of the substrate S. In some variations, all of the flexural wave absorbers 10 absorb the same flexural wave frequency or range of flexural wave frequencies, i.e., all of the flexural wave absorbers 10 have the same size and/or coupled resonators. In other variations, the size and/or coupled resonators of the flexural wave absorbers 10 varies such that the flexural wave absorbers 10 absorb different flexural wave frequencies and/or a range(s) of flexural wave frequencies.

For example, in some variations the plurality of flexural wave absorbers 10 include a first subset of metasurfaces with a first set of coupled resonators and a second subset of metasurfaces with a second set of coupled resonators. In such variations, the first set of coupled resonators can include resonators with a mass equal to $m_{o1}$ and a spring constant equal to $k_{01}$, and the second set of coupled resonators can include resonators with a mass equal to $m_{o2}$ and a spring constant equal to $k_{02}$, and where $m_{o2}$ and/or $k_{o1}$ is not equal to $m_{o1}$ and $k_{o1}$, respectively. In at least one variation the coupled resonators include two lossy resonators and a lossless resonator (FIG. 3A). And in such variations the first subset of metasurfaces absorb greater than 80% of a first frequency range of flexural waves equal to $$0.2f_{01}\left(f_{o1} = \frac{1}{2\pi}\sqrt{k_{o1}/m_{o1}}\right),$$

independent of wave propagation direction, and the second subset of metasurfaces absorb greater than 80% of a second frequency range of flexural waves equal to $$0.2f_{02}\left(f_{o2} = \frac{1}{2\pi}\sqrt{k_{o2}/m_{o2}}\right),$$

independent of the propagating direction. In other variations, the coupled resonators include a lossy resonator and two lossless resonators (FIG. 4A). And in such variations the first subset of metasurfaces asymmetrically absorb greater than 95% of a first frequency range of flexural waves equal to $0.15f_{01}$ and propagating in a first direction, and the second subset of metasurfaces asymmetrically absorb greater than 95% of a second frequency range of flexural waves equal to $0.15f_{02}$ and propagating in the first direction.

Non limiting examples of components and/or substrates that can have one or more flexural wave absorbers disposed thereon include interior motor vehicle panels, interior aircraft panels, and interior wall panels, among others. And while FIG. 9 illustrates the flexural wave absorber attached to and suppress acoustic noise from a separate substrate S, it should be understood the flexural wave absorber 10, and other flexural absorbers disclosed herein, can be a stand-alone structure. That is, the flexural wave absorber 10 itself, and other flexural absorbers disclosed herein, can be a load bearing and/or aesthetic component of a motor vehicle, an aircraft, among others.

It should be understood from the teachings of the present disclosure that flexural wave absorbers that suppress acoustic noise using one or more metasurfaces with coupled resonators are provided. The metasurfaces include an inner portion, an outer portion spaced apart from the inner portion, and beam strips extending between and mechanically coupled to the inner portion and the outer portion. The coupled resonators are disposed on at least a subset of the beam strips and can be a combination of lossy and lossless resonators. Also, the coupled resonators can be designed and/or configured to provide asymmetric or symmetric absorption of flexural waves propagating along a surface and can also be designed and/or configured to provide absorption of a range of flexural wave frequencies.

The preceding description is merely illustrative in nature and is in no way intended to limit the disclosure, its application, or uses. Work of the presently named inventors, to the extent it may be described in the background section, as well as aspects of the description that may not otherwise qualify as prior art at the time of filing, are neither expressly nor impliedly admitted as prior art against the present technology.

As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure and are not intended to limit the disclosure of the technology or any aspect thereof. The recitation of multiple variations or forms having stated features is not intended to exclude other variations or forms having additional features, or other variations or forms incorporating different combinations of the stated features.

As used herein the term "about" when related to numerical values herein refers to known commercial and/or experimental measurement variations or tolerances for the referenced quantity. In some variations, such known commercial and/or experimental measurement tolerances are +/−10% of the measured value, while in other variations such known commercial and/or experimental measurement tolerances are +/−5% of the measured value, while in still other variations such known commercial and/or experimental measurement tolerances are +/−2.5% of the measured value. And in at least one variation, such known commercial and/or experimental measurement tolerances are +/−1% of the measured value.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that a form or variation can or may comprise certain elements or features does not exclude other forms or variations of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one variation, or various variations means that a particular feature, structure, or characteristic described in connection with a form or variation or particular system is included in at least one variation or form. The appearances of the phrase "in one variation" (or variations thereof) are not necessarily referring to the same variation or form. It should be also understood that the various method steps discussed herein do not have to be carried out in the same order as depicted, and not each method step is required in each variation or form.

The foregoing description of the forms and variations has been provided for purposes of illustration and description. It is not intended to be exhaustive or to limit the disclosure. Individual elements or features of a particular form or variation are generally not limited to that particular form or variation, but, where applicable, are interchangeable and can be used in a selected form or variation, even if not specifically shown or described. The same may also be varied in many ways. Such variations should not be regarded as a departure from the disclosure, and all such modifications are intended to be included within the scope of the disclosure.

What is claimed is:

1. A flexural wave absorber comprising:

a metasurface with an inner portion rigidly attached to a thin wall structure, an outer portion free to vibrate, a plurality of beam strips extending between the inner portion and the outer portion, and a plurality of vacant spaces extending through the metasurface between respective adjacent beam strips of the plurality of beam strips; and a plurality of coupled resonators disposed directly on the plurality of beam strips, the coupled resonators spaced apart by a predefined distance equal to 0.2λ, where λ equals a flexural wave wavelength at a resonant frequency propagating along the plurality of beam strips.

2. The flexural wave absorber according to claim 1, wherein the plurality of coupled resonators comprise a lossy resonator and a lossless resonator on each of the plurality of beam strips.

3. The flexural wave absorber according to claim 1, wherein the plurality of coupled resonators comprise two lossy resonators and a lossless resonator on each of the plurality of beam strips.

4. The flexural wave absorber according to claim 1, wherein the inner portion is an inner circular disc.

5. The flexural wave absorber according to claim 1, wherein the outer portion is an outer circular ring and the inner portion is an inner circular disc.

6. The flexural wave absorber according to claim 1, wherein the plurality of beam strips are mechanically coupled to the inner portion and the outer portion.

7. The flexural wave absorber according to claim 1, wherein the inner portion, the outer portion, and the plurality of beam strips are a monolithic structure.

8. The flexural wave absorber according to claim 1, wherein the plurality of coupled resonators each comprise two lossy resonators and a lossless resonator and the metasurface is configured to absorb flexural waves independent of direction of incidence.

9. The flexural wave absorber according to claim 8, wherein the metasurface absorbs greater than 80% of a $0.2f_o$ frequency range of the flexural waves where $$f_o = \frac{1}{2\pi}\sqrt{k_o/m_o},$$

$k_o$ is the spring constant of each of the two lossy resonators and the lossless resonator, and $m_o$=mass of each of the two lossy resonators and the lossless resonator.

10. The flexural wave absorber according to claim 1, wherein the plurality of coupled resonators each comprise a lossy resonator and two lossless resonators and the metasurface is configured to asymmetrically absorb flexural waves propagating in a first direction.

11. The flexural wave absorber according to claim 10, wherein the metasurface absorbs greater than 95% of an $0.15f_0$ frequency range of the flexural waves propagating in the first direction, where $$f_o = \frac{1}{2\pi}\sqrt{k_o/m_o},$$

$k_o$ the spring constant of each of the lossy resonator and the two lossless resonators, and $m_o$=mass of each of the lossy resonator and the two lossless resonators.

12. The flexural wave absorber according to claim 1, wherein the outer portion is rigidly attached to a panel and the inner portion is free to vibrate independent of the panel.

13. The flexural wave absorber according to claim 1, wherein the inner portion is rigidly attached to a panel and the outer portion is free to vibrate independent of the panel.

14. The flexural wave absorber according to the claim 1, wherein the metasurface is a plurality of metasurfaces disposed on a surface, each of the plurality of metasurfaces comprising the inner portion, the outer portion, the plurality of beam strips extending between the inner portion and the outer portion, and the plurality of coupled resonators disposed on the plurality of beam strips.

15. The flexural wave absorber according to claim 14, wherein:

the plurality of metasurfaces comprises a first subset of metasurfaces configured to absorb greater than 95% of a first frequency range of flexural waves equal to $0.15f_{01}$ for and propagating in a first direction;

a second subset of metasurfaces configured to absorb greater than 95% of a second frequency range of flexural waves equal to $0.15f_{02}$ and propagating in the first direction, where the second frequency range is not equal to first frequency range;

$$f_{o1} = \frac{1}{2\pi}\sqrt{k_{o1}/m_{o1}},$$

$k_{o1}$ is the spring constant of each resonator in the first subset of metasurfaces, and $m_{o1}$ is mass of each of the resonators in the first subset of metasurfaces; and $$f_{o2} = \frac{1}{2\pi}\sqrt{k_{o2}/m_{o2}},$$

$k_{o2}$ is the spring constant of each resonator in the second subset of metasurfaces, and $m_{o2}$ is mass of each of the resonators in the second subset of metasurfaces.

16. A flexural wave absorber comprising:

a metasurface with an inner portion rigidly attached to a thin wall structure, an outer portion free to vibrate, a plurality of beam strips extending between the inner portion and the outer portion, and a plurality of vacant spaces extending through the metasurface between respective adjacent beam strips of the plurality of beam strips; and a lossy resonator and a lossless resonator disposed on each of the plurality of beam strips, the lossy resonator and the lossless resonator spaced apart by a predefined distance equal to 0.2λ, where λ equals a flexural wave wavelength at a resonant frequency propagating along the plurality of beam strips.

17. The flexural wave absorber according to claim 16 further comprising another lossy resonator disposed on each of the plurality of beam strips.

18. The flexural wave absorber according to claim 16 further comprising another lossless resonator disposed on each of the plurality of beam strips.

19. A flexural wave absorber comprising:

a plurality of metasurfaces attached to a panel, the plurality of metasurfaces each comprising an inner portion rigidly attached to the panel, an outer portion free to vibrate, a plurality of beam strips extending between the inner portion and the outer portion, a plurality of vacant spaces extending through the plurality of metasurfaces between respective adjacent beam strips of the plurality of beam strips, and a lossy resonator and a lossless resonator disposed directly on each of the plurality of beam strips, the lossy resonator and the lossless resonator spaced apart by a predefined distance equal to 0.2λ, where λ equals a flexural wave wavelength at a resonant frequency propagating along the plurality of beam strips.

20. The flexural wave absorber according to claim 19 further comprising another resonator disposed on each of the plurality of beam strips, the another resonator selected from the group consisting of an another lossy resonator and an another lossless resonator.

* * * * *